No. 835,702. PATENTED NOV. 13, 1906.
M. CARLISLE.
SEARCH LIGHT.
APPLICATION FILED JUNE 26, 1905.
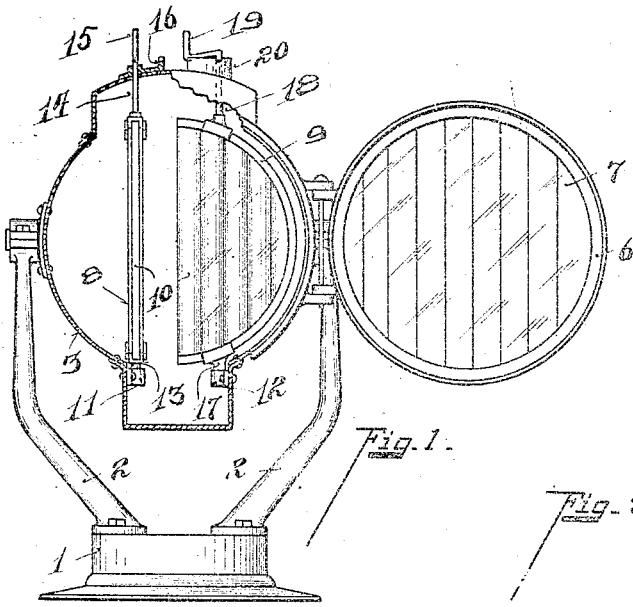
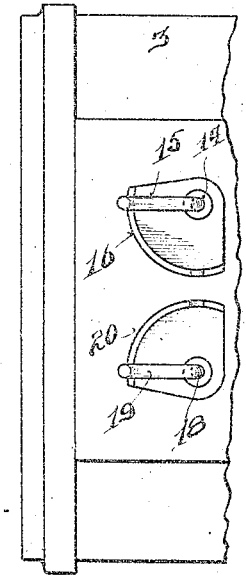
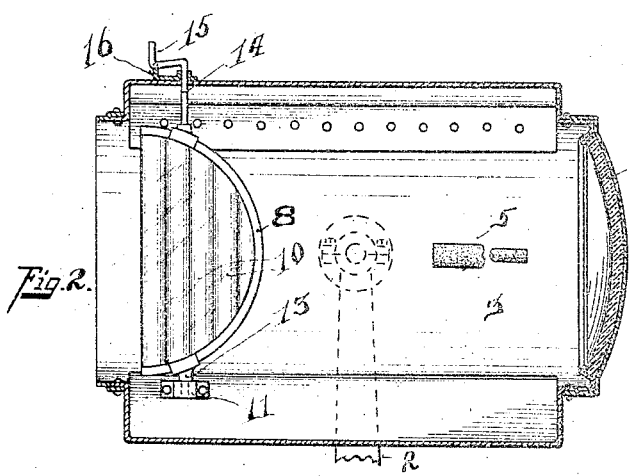
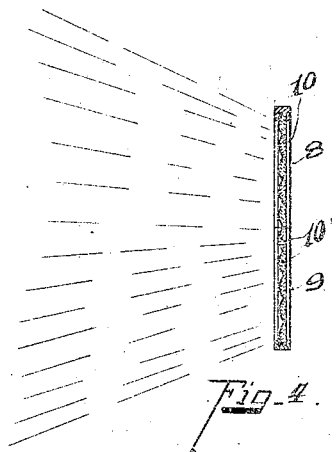
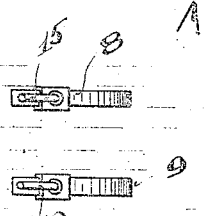

UNITED STATES PATENT OFFICE.

MORTEN CARLISLE, OF CINCINNATI, OHIO, ASSIGNOR TO THE CARLISLE & FINCH COMPANY, OF CINCINNATI, OHIO.

SEARCH-LIGHT.

No. 835,702.	Specification of Letters Patent.	Patented Nov. 13, 1906.

Application filed June 26, 1905. Serial No. 267,117.

*To all whom it may concern:*

Be it known that I, MORTEN CARLISLE, a citizen of the United States, residing at Cincinnati, in the county of Hamilton and State of Ohio, have invented certain new and useful Improvements in Search-Lights, of which the following is a specification.

My invention relates to a search-light, the object being to provide dispersion-lenses as a component part of the device, with means for throwing them in and out of commission.

The features of the invention are more fully set forth in the description of the accompanying drawings, forming a part of this specification, in which—

Figure 1 is a front elevation of the search-light, partly in section, and for convenience of illustration the dispersion-lenses are shown one open and one closed. Fig. 2 is a central vertical section of the device, showing one of the semicircular lenses in elevation. Fig. 3 is a top plan view showing the semicircular-lens-operating handles. Fig. 4 is a horizontal cross-section through the lenses. Fig. 5 is a diagrammatic view showing the position of the semicircular lenses when out of commission.

1 represents the base between the upright limbs 2, on which the search-light is pivoted.

3 represents the casing of the search-light.

4 represents the reflector in the rear of the arc-light 5.

6 represents the covering-disk hinged to the front of the casing, the said disk being composed of the glass strips 7.

8 9 represent semicircular rims in each of which is secured a group of dispersion-lenses 10.

The interior of the casing is provided with the ears 11 12. The rim 8 has a lug 13 pivoted in the ear 11. The rim 8 has an axis or a stem 14 vertically alined with the lug 13, projected through the casing and provided on its outer end with a handle 15.

16 represents an indented plate which cooperates with a handle 15 to hold the rim in adjusted position. The rim 9 is similarly constructed and arranged, in which 17 represents the lug journaling in the ear 12. 18 represents a stem projected through the casing and provided with a handle 19. 20 represents an indented plate for holding the handle in its adjusted position. By this means each rim is pivoted on a vertical axis and can be swung to the open position, (indicated in Fig. 5,) in which the group of lenses are parallel with the light-rays and offer little obstruction to the straight path of the search-light. If it be desired to have the light-rays dispersed laterally, the handles can be turned so that the sections of the circle will meet to complete the circle and to intercept the light-rays and give them the lateral dispersion indicated in Fig. 4.

This device can be readily manipulated by the operator of the light, and it is simple and convenient.

Having described my invention, I claim—

In a search-light, a covering-glass, two semicircular rims U-shaped in cross-section, a series of dispersion-lenses secured between the limbs of said rims, each rim being provided at its lower end with a stud-shaft, and a rod secured to said rim opposite said stud-shaft for pivotally supporting said rims in rear of the cover-glass, said rods extending through the top of the casing and provided with a handle, a cam-plate formed on the casing for each rod for maintaining the dispersion-lenses in their adjusted positions, substantially as described.

In testimony whereof I have hereunto set my hand.

MORTEN CARLISLE.

Witnesses:
OLIVER B. KAISER,
LUISE BECK.